Figure 1:
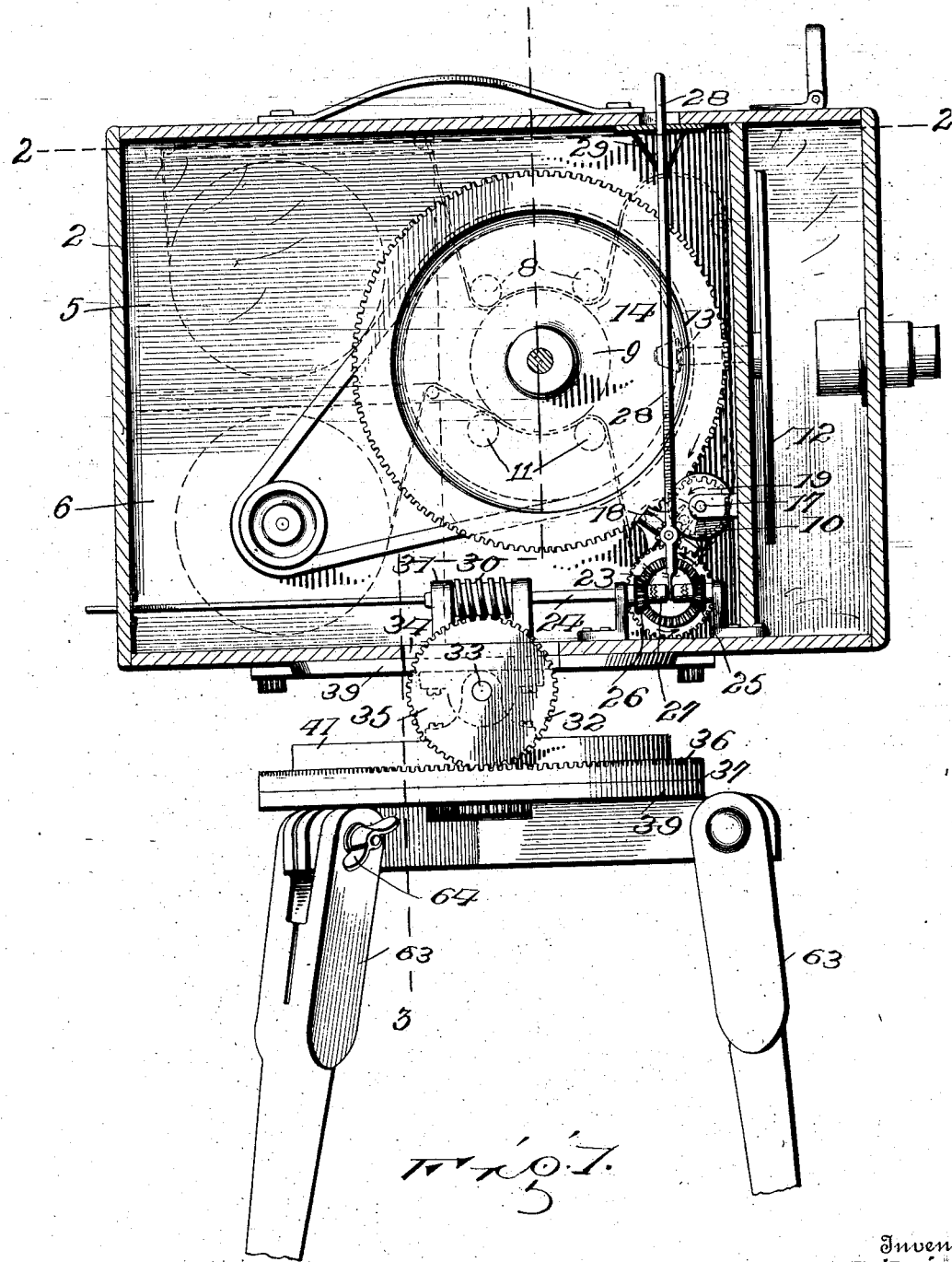

C. A. PHILLIPS.
CAMERA SHIFTING MECHANISM FOR MOVING PICTURE CAMERAS.
APPLICATION FILED OCT. 1, 1912.

1,171,877.

Patented Feb. 15, 1916.
3 SHEETS—SHEET 1.

Inventor
C. A. Phillips

Witnesses

By _____, Attorneys.

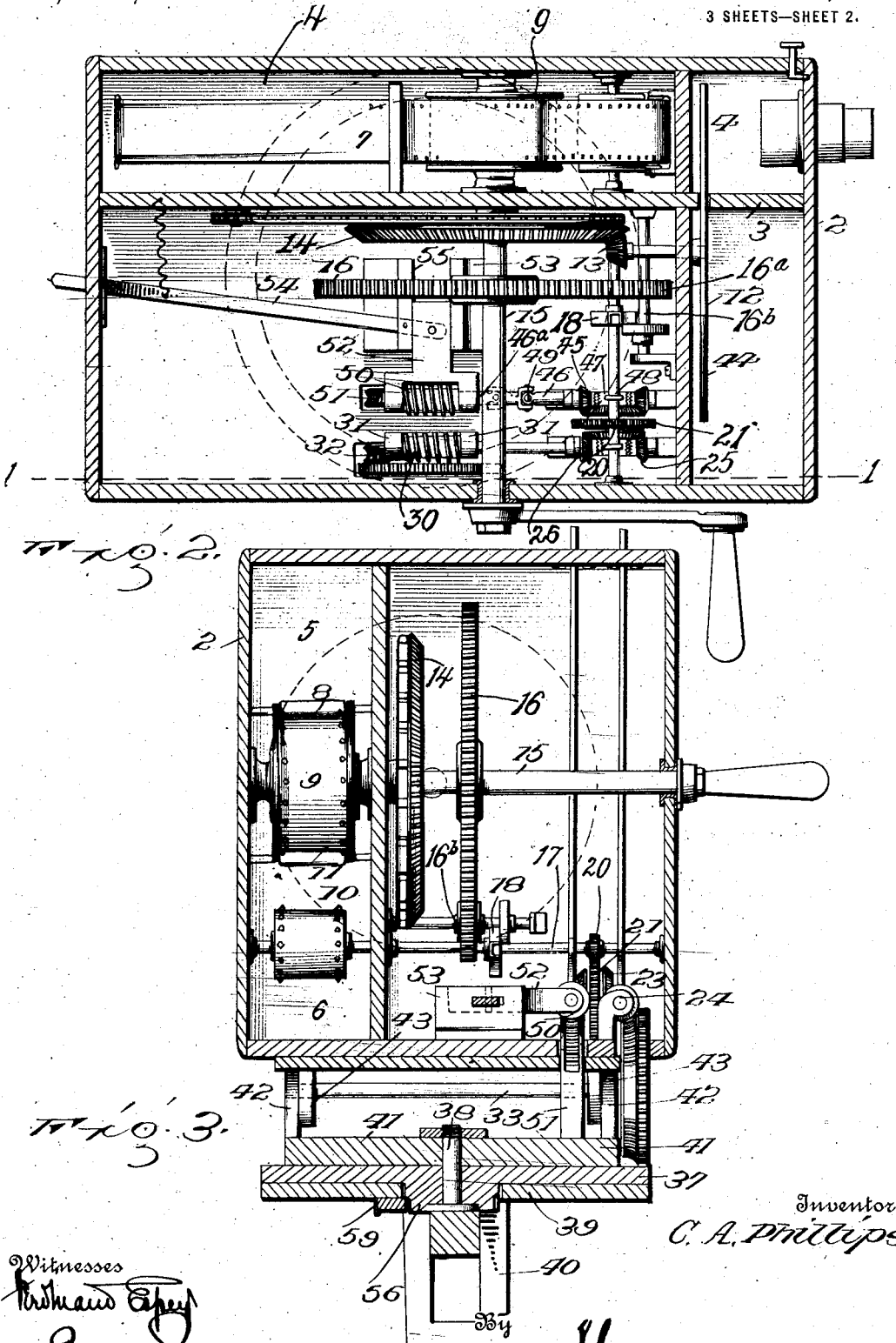

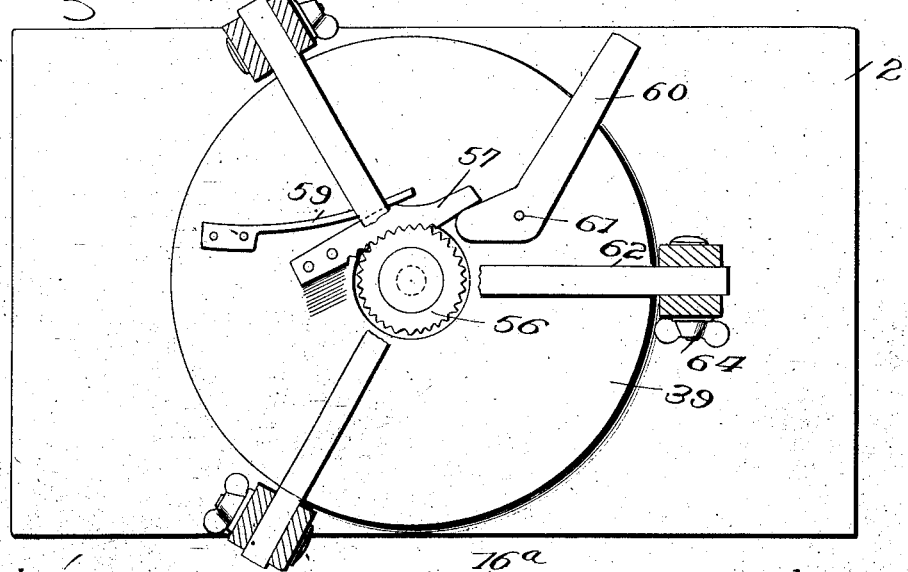
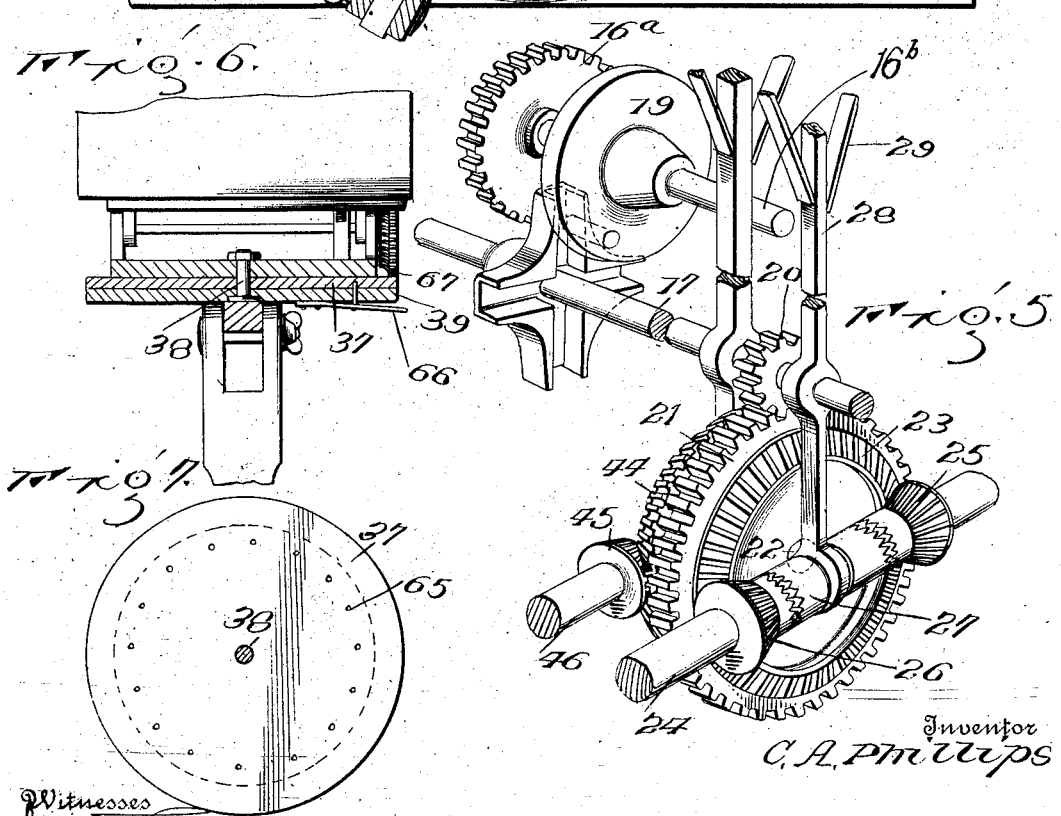

UNITED STATES PATENT OFFICE.

CLARENCE A. PHILLIPS, OF WASHINGTON, DISTRICT OF COLUMBIA.

CAMERA-SHIFTING MECHANISM FOR MOVING-PICTURE CAMERAS.

1,171,877.  Specification of Letters Patent.  Patented Feb. 15, 1916.

Application filed October 1, 1912. Serial No. 723,427.

*To all whom it may concern:*

Be it known that I, CLARENCE A. PHILLIPS, a citizen of the United States, residing at Washington, District of Columbia, have invented certain new and useful Improvements in Camera-Shifting Mechanism for Moving-Picture Cameras, of which the following is a specification.

My invention relates to photographic cameras and particularly to cameras for taking moving pictures. These cameras are often used for taking pictures of objects which the camera must "follow". These objects may travel either in a vertical or a horizontal plane, or in a direction intermediate these two planes.

Heretofore the camera has been shifted by hand to follow the object. This is unsatisfactory not only because of the irregular movement so produced but principally because when the picture taken by the camera is projected, the shifting movement given to the camera while the film is exposed produces a blurred effect. The reason for this is that the camera is moving while the film is exposed.

The primary object of my invention is to provide mechanism which will shift the camera either vertically or horizontally or in a path compounded of a vertical and a horizontal movement only while the film is moving. Thus when the film is displayed the projected image will not be blurred.

A further object is to so construct the shifting mechanism that it shall be actuated by the film feeding mechanism or mechanism coacting therewith so that the camera shall only be shifted while the film itself is being shifted, and so that the shifting mechanism shall be positively geared with the film shifting mechanism whereby the two shall act together.

A further object is to provide means whereby the operator may throw the shifting mechanism into or out of operative engagement with the film feeding mechanism at any time desired and whereby he may shift the camera in either of two directions.

A further object is to provide means whereby the operator may readily shift the camera without using the mechanism connecting the camera shifting means with the transmission shaft or other operative part of the film feeding mechanism.

Other objects will appear in the course of the following description.

My invention is illustrated in the accompanying drawings wherein:

Figure 1 is a vertical section of a camera constructed in accordance with my invention, the section being taken on the line 1—1 of Fig. 2. Fig. 2 is a horizontal section on the line 2—2 of Fig. 1. Fig. 3 is a vertical section on the line 3—3 of Fig. 1. Fig. 4 is an under side plan view, the tripod legs being in section. Fig. 5 is a detail view of the intermittent film feeding shaft, the mechanism for driving it and the mechanism whereby the motion of the shaft may be communicated to the camera to elevate it, depress it or turn it from side to side. Fig. 6 is a side elevation partly sectional of the upper portion of a tripod and the lower portion of the camera showing a modified means for engaging the camera supporting base plate with the rotatable plate. Fig. 7 is a plan view of the plate 39.

Corresponding and like parts are referred to in the following description and indicated in all the views of the accompanying drawings by the same reference characters.

Referring now to these drawings, 2 designates the outer case of the camera which may be of suitable form and which as illustrated is divided into two compartments by a longitudinal partition 3, one of these compartments being designed to contain the actuating mechanism for the film feeding shaft, and the other of which compartments contains the retorts or magazines from which the film is delivered and into which it is received. Of course, the details of the film magazine and film feeding mechanism are not shown as these form no part of my invention.

It will be seen from Figs. 2 and 3 that the film compartment 4 contains the retorts 5 and 6 shown in dotted lines in Fig. 1, and that from the retort 5 the film 7 passes upward over suitable guide rollers, then down beneath the tension rollers 8, 8 and in contact with the sprocket wheel 9, then upward to form the upper loop and downward in front of the camera gate or pressure door (not illustrated), then down around the lower roller 10, then upward again over the tension rollers 11 and in contact with the sprocket wheel 9 and over suitable guide rollers back to the receiving or take-up retort 6. It is to be understood that the film when it passes into the retort 6 is wound upon a reel disposed within said retort, this reel being driven by a sprocket chain, belt or any other suitable device from a band wheel or sprocket wheel mounted upon the shaft 15 and illustrated as made integral with the gear wheel 14.

I wish it understood that the mechanism heretofore referred to is the ordinary mechanism to be found in moving picture cameras and no part of it is my invention, and that I do not wish to be limited to any particular details of construction nor to the mechanism described.

The film as will be well understood by those skilled in the art moves intermittently, and mounted to coact with the movement of the film is a shutter 12 which moves continuously but is formed with an opening which uncovers the film during its period of rest and occults the film during its period of movement. The shutter as illustrated is driven by a bevel gear wheel 13 which engages with a bevel gear wheel 14 considerably larger in diameter than the bevel gear wheel 13 and mounted upon a shaft 15 which passes entirely through the side of the camera and which carries upon it the sprocket wheel 9. This shaft carries upon its outer end a crank and forms the main drive shaft of the film feeding and shutter actuating mechanism. A gear wheel 16 on this shaft engages a pinion 16ª on a counter shaft 16ᵇ.

Mounted upon a shaft 17 which I will hereafter call the film feeding shaft, is a star wheel designated 18 which is actuated intermittently by a pin projecting from a disk 19, on shaft 16ᵇ. It will be seen that this combination constitutes the ordinary Geneva stop motion ordinarily used in machines of this character to secure an intermittent actuation of the film feeding shaft from the continuously operating driving gear. I do not wish to be limited to any particular method of driving the shaft 17 intermittently as various mechanisms may be used for the purpose and these mechanisms form no part of my present invention. Also mounted upon the shaft 17 is a pinion 20 which engages a spur gear wheel 21 mounted upon a shaft 22. Formed integral with this wheel 21 or mounted upon its shaft is a bevel gear 23, and extending longitudinally of the camera is a shaft 24 carrying upon it the loose bevel gear wheels 25 and 26. These wheels are oppositely disposed and engaged with diametrically opposite portions of the bevel gear wheel 23. Mounted between these bevel gear wheels 25 and 26 and splined upon the shaft 24 is a double clutch 27 having oppositely disposed clutch teeth and adapted to engage the clutch teeth on either one of the gears 25 or 26 or to be shifted to a neutral position where it will engage neither of these clutch teeth so that the gears will revolve without actuating the shaft 24. It is obvious that by shifting the clutch sleeve 27 from one extreme of its movement to the other, one or the other of the bevel gear wheels 25 or 26 will be operatively engaged with the shaft and that thereby the shaft 24 will be rotated in one direction or the other.

For the purpose of shifting the clutch sleeve 27, I provide a lever 28 which is pivoted upon the shaft 17 and formed with a downwardly projecting finger having a reduced lower portion forming a yoke engaging a groove in the clutch sleeve. This lever 28 is preferably held in a neutral position by means of opposed springs 29. These springs as illustrated are angular in form and the resilient terminal ends thereof extend down on each side of the lever. It will be obvious that the lever may be pressed in one direction or the other to throw the clutch sleeve so as to rotate the shaft 24 in one direction or the other, but when pressure is released from the lever 28, the spring will return to its neutral position and the shaft 24 will be designated from the shaft 22.

Mounted upon the shaft 24 is a worm 30, the shaft being supported in bearings 31. This worm engages with a worm gear wheel 32 mounted upon a shaft 33 supported in bearings on the under side of the camera, the bottom of the camera being cut away as at 34 to permit the worm gear 32 to project into engagement with the screw threads of the worm 30. Carried by the shaft 33 and preferably formed integral with the worm gear 32 is a gear wheel 35 having the form of a spur gear whose teeth engage and intermesh with an annular rack 36 mounted upon the bed plate 37 which forms the base for the camera and which is carried upon tripod legs as will be later described.

It will be obvious that a rotation of the gear 35 will cause a rotation of the camera around its center of motion, the camera being rotatably connected to the center of the base 37 as is shown in Fig. 3, that is, the base 37 is formed with a central perforation through which a bolt 38 passes, this bolt being connected centrally to a table 39 mounted upon tripod legs 40. Supported upon the base 37 is a disk or table 41 through which the bolt 38 passes and which carries bearings 42 for the shaft 33. Extending downward from the bottom of the camera are the bearings 43 which also engage the shaft 33 so that the camera is mounted for pivotal movement upon the shaft 33 whereby it may be rotated in a vertical plane as well as rotated in a horizontal plane.

It will be obvious that with the construction heretofore described the intermittent rotary movement given to the shaft 17 will cause an intermittent rotary movement of the shaft 22 which in turn, provided the lever 28 be thrown, will be communicated to the shaft 24 and rotate this shaft 24 in one or the other direction depending upon which of the gears 25 or 26 is in engagement with the bevel gear wheel 23. This rotation of the shaft 24 through the worm 30 will communicate motion to the gear wheel 35 and this in turn will rotate the camera in a horizontal plane, this movement only taking place however at the time that the shaft 17 is actuated and this shaft 17 only being actuated at the time that the film is being shifted and the shutter has been interposed between the film and the camera lenses.

The mechanism for giving a vertical movement to the camera coincident with the movement of the film feeding shaft is practically the same as heretofore described. Mounted upon the shaft 17 is a bevel gear wheel 44 which engages with the relatively small bevel pinions or gear wheels 45 mounted upon a transverse shaft 46 which extends parallel to the shaft 24. These bevel gear wheels 45 are loosely mounted upon the shaft 46 and formed with clutch teeth, and between the said bevel gear wheels is disposed a sliding sleeve 47 having oppositely disposed clutch teeth, this sleeve being actuated by a lever 48 so that either one of the gears 45 may be shifted into engagement with the gear 44.

The shaft 46 is formed in three sections 46 and 46ª connected by universal joints 49 so that the section 46ª of the shaft may be shifted laterally, that is, away from the worm gear wheel with which it coacts. Formed upon the shaft 46 is the worm 50 which engages with a fixed sector gear 51 mounted upon the shaft 33. It will be obvious that upon a rotation of the shaft 46, 46ª, the worm 50 will operatively engage the gear segment 51 and that as a consequence the camera box will be tilted either in one direction or the other, and it is also obvious that this movement will only occur coincidentally with a movement of the film in precisely the same manner as before described for the mechanism giving a horizontal movement to the camera.

For the purpose of disengaging the worm 50 from the gear segment 51 to permit the camera to be moved vertically by hand, I provide the slide yoke 52 which is mounted in guides 53 and which has the yoke portion provided with oppositely disposed bearings for the shaft section 46ª. This sliding yoke at its end is pivotally connected to a lever 54 which passes out through the rear end of the camera box as shown in Fig. 2. A spring or like device holds the slide 52 in such position that the worm 50 is in engagement with the gear segment 51 and the movement of the lever 54 is against the action of this spring. It will be plain that by shifting the lever 48 in one direction or the other, the direction of movement of the camera may be changed from a movement upward to a movement downward or vice versa, and that by shifting the lever 54, the vertical shifting mechanism of the camera may be entirely disconnected from the driving mechanism and thus the camera may be freely moved by hand.

In order to disconnect the camera from the mechanism for giving it a movement in a horizontal plane so that the camera may be moved in a horizontal plane by hand, I provide the base plate 39 upon which the base 37 is rotatable. This base plate 39 is formed with a central aperture 55 and the plate 37 is formed with a depending central hub 56 provided with ratchet teeth upon its circumference as shown in Fig. 4. Under normal circumstances, the base plate 37 is held in rigid engagement with the plate 39 to which the tripod legs are attached by means of a pawl or clutch 57 which is pivoted or otherwise mounted on the under face of the plate 39 and which is provided with a slightly recessed edge formed with teeth 58 adapted to engage with the teeth of the hub 56, this pawl being held in engagement with the hub 56 by means of a spring 59. The pawl may be moved out of such engagement by means of a finger 60 pivoted at 61 to the plate 39 and which is angular in form to engage the extremity of the latch or pawl 57. By shifting the finger in the direction of the arrow, Fig. 4, the latch will be moved out of engagement with the hub and under these circumstances it is obvious that the plate 37 with the camera mounted thereon may be freely shifted horizontally, the gear wheel 35 not rotating under these circumstances. As soon as pressure is released upon the finger 60, however, the spring 59 will cause the latch 57 to reëngage the hub 56. The plate 39 is provided with radially extending supporting bars 62 and the upper ends of the tripod legs 63 are bifurcated and pivoted to the projecting ends of the bars 62 by means of thumb bolts 64 or in any other suitable manner.

In Figs. 6 and 7 I show another means whereby the camera supporting plate 37 may be engaged with the base 39 or disengaged therefrom to permit the camera to be rotated freely by hand in a horizontal plane. This consists in forming the plate 37 with a plurality of openings 65 arranged in a circular series and providing the plate 39 with a spring 66 projecting radially outward from the plate and carrying an upwardly projecting pin 67 adapted to engage in any of the perforations 65. Thus normally the two plates 37 and 39 will be held rigid with each other but when the spring 66 is depressed and the pin withdrawn from the plate 37, the plate 37 and the camera mechanism supported thereon will shift freely independently of the plate 39.

The operation of the invention will be obvious from what has gone before. Upon a rotation of the handle 16, the film will be fed intermittently forward. If the levers 28 and 54 are left untouched, the camera will be held in any desired directed position. When, however, it is desired to follow an object upward, the lever 48 is shifted in one direction, whereupon the worm 50 will engage the gear segment 51 and rotate the camera in a vertical plane. When it is desired that the camera shall follow in a horizontal plane, the lever 28 is actuated in one direction or the other which will actuate the worm 30 and thus engage the gear wheel 35 which will rotate the camera bodily in a horizontal plane. It is obvious that by actuating both of the levers 28 and 48, the camera may be given a movement compounded of the movement in horizontal and vertical planes. As soon as the operator removes his fingers from the levers 28 and 48, however, the levers will return to their original position and the camera will once more come to a standstill. If it is desired to shift the camera box quickly by hand and without recourse to the gearing described, it is only necessary to shift the lever 54. It will likewise be noted, and is the vital point of my invention, that the camera only moves either for rotation in a horizontal or vertical plane when the film moves, and that at the time that the film is exposed for taking a picture, the camera does not move, thereby obviating the objection heretofore mentioned and preventing any blurring of the picture. When a film taken in my improved camera is projected, there will be no blur or irregularity in the movement. The lateral or vertical movement of the picture will be accomplished as evenly as the movement of the object within the bounds of the picture.

While I have illustrated what I believe to be the best form of my invention, and one which is thoroughly effective, I wish it understood that I do not limit myself to the specific details thereof or to the particular mechanism shown inasmuch as many different arrangements of parts and many different mechanisms might be used for securing the same end.

What I claim is:

1. In an apparatus of the class described, a support, a camera rotatably mounted upon the support and embodying means for intermittently feeding a film, means for rotating the camera, and means for connecting and disconnecting the film feeding means and the camera rotating means.

2. In an apparatus of the character described, a camera, a support therefor upon which the camera is rotatably mounted, intermittently actuated means for feeding a film through the camera, and means operatively connectible with the film feeding means and operating coincidently therewith for rotating the camera coincidently with the movement of the film.

3. In an apparatus of the class described, a support, a camera mounted thereon and angularly movable, means for angularly moving the camera, the camera embodying means for intermittently feeding a film, and means for connecting and disconnecting the film feeding means and the camera moving means.

4. In an apparatus of the character described, a camera, a support therefor upon which the camera is rotatably mounted, means for intermittently shifting a film through the camera, and means adapted to be placed in operation to rotate the camera relative to said support in coincidence with the movement of the film.

5. In an apparatus of the class described, a camera, a support upon which the camera is mounted for rotation upon vertical and horizontal pivots, and film feeding mechanism including an intermittently rotated film feeding shaft, and means adapted to be actuated by the shaft for causing rotation of the camera upon either of its pivots coincidently with the movement of the said shaft.

6. In a moving picture apparatus, a camera, a support upon which the camera is rotatably mounted, film feeding mechanism intermittently actuated, and means operative in co-relation with and adapted to be operatively connected with the film feeding mechanism for rotating the camera.

7. A moving picture apparatus including a camera, a support therefor upon which the camera is mounted for rotation about a vertical axis, intermittently actuated film-feeding mechanism, and means adapted to be operatively connected with the film feeding mechanism and the camera, for rotating the camera about its said axis, synchronously with the movement of the film feeding means.

8. In a moving picture apparatus, a camera, a support upon which the camera is mounted for rotation about a horizontal axis, intermittently actuated film feeding mechanism, means for rotating the camera and means operative to connect the camera rotating means and the film feeding mechanism for synchronous movement.

9. In a moving picture apparatus, a camera, a support therefor upon which the camera is mounted for rotation in a vertical plane and in a horizontal plane, means for rotating the camera in a horizontal plane, means for rotating the camera in a vertical plane, intermittently actuated film-feeding mechanism, means adapted to operatively connect either of the camera rotating means with the film feeding means, and means for shifting either one of said camera rotating means into operative engagement with the film feeding means.

10. A moving picture apparatus including a camera, a support upon which the camera is mounted for rotation in one plane, intermittently actuated film feeding mechanism, means for rotating the camera in said plane in either of two directions, and means for operatively connecting the camera rotating means with the film feeding means for synchronous movement therewith in either of said two directions.

11. A moving picture apparatus including a camera, support therefor upon which the camera is mounted for rotation either in a vertical plane or in a horizontal plane, means for rotating the camera in a horizontal plane in either of two directions, means for rotating the camera in a vertical plane in either of two directions, intermittently operated film feeding mechanism, and means for operatively connecting either of said camera rotating means with the film feeding mechanism for coincident movement.

12. A moving picture apparatus including a camera, a support therefor upon which the camera is rotatably mounted for movement in a plane, intermittently actuated film feeding mechanism, means for rotating said camera relative to the support, means adapted to operatively connect the camera rotating means with said film feeding means whereby to operatively drive the former from the latter, and means for shifting said connecting means into and out of operative position.

13. A moving picture apparatus including a camera, a support therefor upon which the camera is mounted for rotation in a horizontal plane, intermittently actuated film feeding mechanism, means for operatively connecting the camera rotating mechanism with the film feeding mechanism whereby to rotate the camera in co-relation with the film-feeding mechanism, and means for rotating the camera independently of the film feeding mechanism.

14. A moving picture camera including means for rotating the camera in a horizontal plane, means for rotating the camera in a vertical plane, means intermittently actuated for feeding the film through the camera, and manually operable means for operatively connecting the film feeding mechanism with the camera rotating mechanism or disconnecting it therefrom, and manually operable means whereby the camera may be released and freely rotated by hand.

15. A moving picture camera including means for rotating the camera in a horizontal plane, intermittently operated film feeding mechanism, means for rotating the camera independently of the film feeding mechanism, and means for operatively engaging the first mentioned camera rotating mechanism with the film feeding mechanism whereby to rotate the camera in correlation with the film feeding mechanism.

16. A moving picture camera including a support upon which the camera is mounted for rotation in either a vertical or a horizontal plane, intermittently operated film feeding mechanism disposed within the camera, and means engageable with the film feeding mechanism for rotating the camera in a horizontal or a vertical plane.

17. A moving picture camera including a support upon which the camera is mounted for rotation either in a horizontal or a vertical plane, intermittently actuated film feeding mechanism, mechanism disposed within the camera for rotating the camera in a horizontal plane, mechanism disposed within the camera for rotating the camera in a vertical plane, and manually operable means for connecting said camera rotating means with the film feeding mechanism.

18. A moving picture camera including a support upon which the camera is mounted for rotation either in a vertical or a horizontal plane, intermittently operated film feeding mechanism disposed within the camera, gearing for rotating the camera in a vertical plane in one direction or in a vertical plane in the opposite direction, gearing for rotating the camera in a horizontal plane in one direction or in a horizontal plane in the other direction, means for operatively connecting the first named gearing with the film feeding mechanism or disconnecting it therefrom, and means for operatively connecting the second named gearing with the film feeding mechanism or disconnecting it therefrom.

19. A moving picture camera including a film feed shaft intermittently actuated, a support upon which the camera is mounted for rotation in a vertical plane or a horizontal plane, mechanism for rotating the camera in a horizontal plane in either of two directions, mechanism for rotating the camera in a vertical plane in either of two directions, and manually actuatable means for operatively connecting said mechanisms with or disconnecting them from the film feed shaft.

20. A moving picture camera including a camera support, a camera rotatably mounted upon said support for movement in a horizontal plane, a base plate having a circular series of gear teeth, film feeding mechanism including an intermittently driven film feed shaft, a gear wheel mounted upon the camera and engaging said gear teeth, and mechanism for operatively connecting or disconnecting the gear wheel to or from the film feed shaft.

21. A moving picture camera including a support, a camera mounted thereon for rotation in a horizontal plane, a base plate upon which the camera is mounted and provided with marginal teeth arranged in annular series, a gear wheel mounted upon the camera and engaging said teeth, film feed mechanism including an intermittently driven film feed shaft, manually actuatable mechanism for operatively connecting the film feed shaft with said gear wheel or disconnecting it therefrom, and means normally engaging said plate with said support but shiftable to disengage the plate from the support to permit the base plate and camera to rotate freely upon the support.

22. A moving picture camera including a support, a vertically disposed gear segment thereon, a camera mounted on said support for rotation in a vertical plane, a film feed mechanism including an intermittently actuated film feed shaft, mechanism on the camera engaging said gear segment, and means for operatively engaging the film feed shaft with said mechanism or disengaging it therefrom.

23. A moving picture camera including a support upon which the camera is mounted for rotatable movement, a gear wheel carried by the camera, film feeding mechanism including an intermittently driven film feed shaft, a worm gear engaging said gear wheel, and means for operatively connecting the worm gear with said film feed shaft, or disconnecting it therefrom, whereby to rotate the camera in corelation with the rotation of the film feed shaft.

24. In a moving picture camera, a circular plate having an annular series of teeth, a gear wheel engaging said teeth, a worm engaging said gear wheel, film feeding mechanism including an intermittently actuated film feed shaft, a bevel gear carried by the worm, oppositely disposed bevel gears either of which may engage said bevel gear on the worm and driven from said film feed shaft, and means for shifting the bevel gear wheel on the worm into or out of operative engagement with either one of said driving bevel gears.

25. A moving picture camera including a support upon which the camera is mounted for rotatable movement, film feeding mechanism including an intermittently actuated film feed shaft, a pinion thereon, a gear wheel with which the pinion engages, a bevel gear rotating with the gear wheel, a driven shaft, oppositely disposed loose bevel gears on the driven shaft engaging the first named gear wheel and formed with clutch members, a sliding clutch splined on the driven shaft and movable into engagement with either one of said loose bevel gear wheels, and camera rotating mechanism adapted to be operatively connected to said driven shaft.

26. A moving picture camera including a support upon which the camera is mounted for rotatable movement, film feeding mechanism including an intermittently actuated film feed shaft, a pinion carried on the film feed shaft, a gear wheel with which the pinion engages, a bevel gear wheel rotatable with the first named gear wheel, a driven shaft, loose bevel gear wheels mounted upon the driven shaft and engaging diametrically opposite portions of the first named bevel gear wheel and having clutch teeth, a clutch sleeve shiftable on the driven shaft into or out of engagement with either one of the clutch teeth on the bevel gear wheels, resilient means for holding said sleeve in a median position, means for shifting the clutch sleeve, and camera rotating devices adapted to be operatively connected to the driven shaft.

27. A moving picture camera including a support upon which the camera is mounted for rotatable movement, film feeding mechanism including an intermittently actuated film feed shaft, a pinion thereon, a gear wheel with which the pinion engages, a bevel gear wheel moving with the first named gear wheel, a driven shaft extending across the face of the bevel gear wheel, oppositely disposed loose bevel pinions on said shaft engaging diametrically opposite portions of the bevel gear wheel and formed with clutch teeth, a sleeve splined upon the driven shaft and having oppositely disposed clutch teeth, a lever for shifting said sleeve to carry the sleeve into engagement with one or the other of the bevel pinions, oppositely disposed springs holding the lever in a median position, a fixed circular rack, and a spur gear operatively mounted upon the camera and engaging said rack, and a worm on the driven shaft engaging said spur gear.

28. A moving picture camera including a support upon which the camera is mounted for rotatable movement, an intermittently operated film feeding shaft, a pinion on said shaft, a gear wheel engaging with the pinion, a bevel gear wheel rotatable with the first named gear wheel, a driven shaft, oppositely disposed loose pinions on the driven shaft engaging the bevel wheel, a sliding clutch sleeve on the driven shaft movable into engagement with either one of the pinions, a lever for operating the clutch sleeve, and camera rotating mechanism adapted to be operatively connected to the driven shaft.

29. A moving picture camera including a support upon which the camera is mounted for rotatable movement in a vertical plane, an intermittently actuated film feed shaft, a pinion on the film feed shaft, a gear wheel with which the pinion engages, a bevel gear wheel movable with said first named gear wheel, a driven shaft, loose bevel pinions on the driven shaft engaging said bevel gear wheel, a shiftable clutch for engaging either one of the bevel pinions with the driven shaft, a worm on the driven shaft, and a fixed segment gear extending up through the bottom of the camera and with which said worm engages.

30. A moving picture camera including a support upon which the camera is mounted for rotatable movement in a vertical plane, an intermittently actuated film feed shaft, a pinion on the film feed shaft, a gear wheel with which the pinion engages, a bevel gear wheel movable with said first named gear wheel, a driven shaft, loose bevel pinions on the driven shaft engaging said bevel gear wheel, a shiftable clutch for engaging either one of the bevel pinions with the driven shaft, a worm on the driven shaft, a fixed segment gear extending up through the bottom of the camera and with which said worm engages, and means for shifting said worm out of engagement with the segment gear.

31. A moving picture camera including a support upon which the camera is mounted for rotatable movement in a vertical plane, an intermittently actuated film feed shaft, a pinion on the film feed shaft, a gear wheel with which the pinion engages, a bevel gear wheel movable with said first named gear wheel, a driven shaft, loose bevel pinions on the driven shaft engaging said bevel gear wheel, a shiftable clutch for engaging either one of the bevel pinions with the driven shaft, a worm on the driven shaft, a fixed segment gear extending up through the bottom of the camera and with which said worm engages, and means for laterally shifting the worm out of engagement with the segment gear.

32. A moving picture camera including a support upon which the camera is mounted for rotatable movement in a vertical plane, an intermittently actuated film feed shaft, a pinion on the film feed shaft, a gear wheel with which the pinion engages, a bevel gear wheel movable with said first named gear wheel, a driven shaft, loose bevel pinions on the driven shaft engaging said bevel gear wheel, a shiftable clutch for engaging either one of the bevel pinions with the driven shaft, a worm on the driven shaft, a fixed segment gear extending up through the bottom of the camera and with which said worm engages, universal joints formed in said driven shaft, a worm carried on the driven shaft, a slide engaging the end of the driven shaft, and a lever for actuating said slide to draw the worm out of engagement with the segment gear.

33. A moving picture camera including a support upon which the camera is mounted, said support having rotatable movement in a horizontal plane, the camera being mounted upon said support for rotatable movement in a vertical plane, a circular rack forming part of the first named support, a segment gear carried upon said support and projecting through the camera, a spur gear mounted upon the camera and engaging said rack, worm gears engaging one, the segment gear and the other said spur gear, a driven shaft operated in one direction, an intermittently actuated film feed shaft, means for operatively connecting the said shafts, means for operatively connecting either of the worm gears to said driven shaft to rotate the worm gears in either direction whereby to secure either a vertical rotation of the camera, a horizontal rotation of the camera, or a movement of the camera compounded of the two.

34. A moving picture camera including supporting legs, a base plate mounted thereon, a plate rotatably mounted upon the base plate and having a circumferential rack, a plate rotatably mounted upon the last named plate, a shaft mounted upon the last named plate and forming a pivotal support for the camera for movement in a vertical plane, a spur gear carried on said shaft and engaging said rack, means for locking the base plate to the plate above or unlocking it therefrom to permit a free rotation of the camera in a horizontal plane, a segment gear mounted upon the uppermost plate and projecting into the camera, a worm gear wheel forming part of or operatively connected to the gear wheel engaging rack, parallel worms engaging one the segment gear and the other the worm gear wheel, parallel shafts upon which the worms are mounted, oppositely disposed loose pinions on the shafts, oppositely disposed bevel gears engaging said pinions, means for operatively connecting either pinion of a pair of pinions in engagement with the corresponding shaft, a gear wheel operatively connected to the bevel gear wheels, an intermittently actuated film feeding shaft, and a pinion thereon meshing with said last named gear wheel.

In testimony whereof I affix my signature in presence of two witnesses.

CLARENCE A. PHILLIPS. [L. S.]

Witnesses:
JOSEPH C. ZIRKLE,
M. CULVERWELL.